(12) United States Patent
Barckmann et al.

(10) Patent No.: US 12,337,874 B2
(45) Date of Patent: *Jun. 24, 2025

(54) DRIVE DEVICE FOR A SYSTEM FOR CHANGING MEANS OF TRANSPORTATION, USE AND SYSTEM FOR CHANGING MEANS OF TRANSPORTATION

(71) Applicant: EDAG Engineering GmbH, Wiesbaden (DE)

(72) Inventors: Johannes Barckmann, Fulda (DE); Thomas Hasenauer, Fulda (DE)

(73) Assignee: EDAG Engineering GmbH, Wiesbaden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/541,265

(22) Filed: Dec. 15, 2023

(65) Prior Publication Data

US 2024/0116542 A1 Apr. 11, 2024

Related U.S. Application Data

(63) Continuation of application No. 17/440,298, filed as application No. PCT/EP2020/057709 on Mar. 19, 2020, now Pat. No. 12,005,931.

(30) Foreign Application Priority Data

Mar. 20, 2019 (DE) ...................... 10 2019 203 797.6

(51) Int. Cl.
*B60W 60/00* (2020.01)
*B62D 63/02* (2006.01)
(Continued)

(52) U.S. Cl.
CPC ....... *B60W 60/0025* (2020.02); *B62D 63/025* (2013.01); *B65F 3/04* (2013.01); *B25J 5/007* (2013.01)

(58) Field of Classification Search
CPC .... B60W 60/0025; B62D 63/025; B65F 3/04; B25J 5/007
See application file for complete search history.

(56) References Cited

U.S. PATENT DOCUMENTS

| | | | |
|---|---|---|---|
| 4,645,023 A | 2/1987 | Rea et al. | |
| 5,490,755 A * | 2/1996 | Billotte | B62D 53/06 180/24.03 |

(Continued)

FOREIGN PATENT DOCUMENTS

| | | |
|---|---|---|
| CH | 699 320 A2 | 2/2010 |
| CN | 1220635 A | 6/1999 |

(Continued)

OTHER PUBLICATIONS

International Search Report and Written Opinion for International Application No. PCT/EP2020/057709, dated Jun. 15, 2020, 11 pages.

(Continued)

*Primary Examiner* — Khoi H Tran
*Assistant Examiner* — Nhi Q Bui
(74) *Attorney, Agent, or Firm* — Westman, Champlin & Koehler, P.A.

(57) ABSTRACT

A drive device for a transport means changing system, comprising: a drive train configured for use on the road; an interface configured for coupling to a passenger cabin and/or cargo cabin; comprising a work device which performs work activities, which are independent of transportation, wherein the drive device has a first operating mode in which it is coupled to at least one passenger cabin and/or cargo cabin and is configured to carry out autonomous transportation of passengers and/or cargo, and wherein the drive device has a second operating mode in which it is decoupled from a passenger cabin and/or cargo cabin and configured for autonomous mobile performance of the work activities by (Continued)

the work device or by a coupled tool module. The present invention further relates to a corresponding use of a drive device and a corresponding transport means changing system.

17 Claims, 10 Drawing Sheets

(51) Int. Cl.
*B65F 3/04* (2006.01)
*B25J 5/00* (2006.01)

(56) References Cited

U.S. PATENT DOCUMENTS

| | | | |
|---|---|---|---|
| 8,727,426 B2 | 5/2014 | Vitale et al. | |
| 9,720,414 B1* | 8/2017 | Theobald | B25J 5/007 |
| 10,562,433 B2 | 2/2020 | Berning et al. | |
| 2006/0170188 A1 | 8/2006 | Negre et al. | |
| 2010/0119340 A1* | 5/2010 | Flood | B65F 1/1484 |
| | | | 414/408 |
| 2013/0241236 A1 | 9/2013 | Vitale et al. | |
| 2014/0262583 A1 | 9/2014 | Url | |
| 2015/0045992 A1* | 2/2015 | Ashby | E02F 9/205 |
| | | | 701/2 |
| 2015/0142250 A1 | 5/2015 | Cavender-Bares et al. | |
| 2016/0129958 A1 | 5/2016 | Byrnes et al. | |
| 2017/0367252 A1* | 12/2017 | Sakaguchi | A01B 69/008 |
| 2018/0050626 A1* | 2/2018 | Delp | G06Q 50/40 |
| 2018/0126891 A1 | 5/2018 | Berning et al. | |
| 2018/0317725 A1* | 11/2018 | Lee | B25J 15/0491 |
| 2019/0086934 A1* | 3/2019 | Canoso | G05D 1/0231 |
| 2019/0246858 A1* | 8/2019 | Karasikov | A47L 9/2894 |

FOREIGN PATENT DOCUMENTS

| | | |
|---|---|---|
| CN | 1678488 A | 10/2005 |
| CN | 103303390 A | 9/2013 |
| CN | 108001332 A | 5/2018 |
| DE | 102013004837 A1 | 9/2014 |
| DE | 10 2014 015 698 A1 | 4/2016 |
| DE | 10 2016 011 656 A1 | 3/2017 |
| DE | 10 2018 002 229 A1 | 8/2018 |
| EP | 2 363 338 A1 | 9/2011 |
| EP | 3 315 390 A1 | 5/2018 |
| RU | 2086 U1 | 5/1996 |
| WO | 2012141591 A1 | 10/2012 |

OTHER PUBLICATIONS

Search results for German Patent Application No. 10 2019 203 797.6, dated Jan. 20, 2020, 10 pages.
First Office Action, including Search Report, for Chinese Patent Application No. 202080035062.X, dated Feb. 7, 2023, 18 pages.
Non-Final Rejection for U.S. Appl. No. 17/440,298, mailed May 11, 2023, 27 pages.
Final Rejection for U.S. Appl. No. 17/440,298, mailed Nov. 9, 2023, 26 pages.

\* cited by examiner

DRIVE DEVICE FOR A SYSTEM FOR CHANGING MEANS OF TRANSPORTATION, USE AND SYSTEM FOR CHANGING MEANS OF TRANSPORTATION

CROSS-REFERENCE TO RELATED APPLICATION(S)

This application is a continuation application of U.S. patent application Ser. No. 17/440,298, filed Sep. 17, 2021, which in turn is a Section 371 National Stage of International Application No. PCT/EP2020/057709, filed on 19 Mar. 2020, which published as WO 2020/188067 A1, on 24 Sep. 2020, which claims priority to German Patent Application No. 10 2019 203 797.6, filed on 20 Mar. 2019, the contents of which are hereby incorporated by reference in their entireties.

FIELD OF THE INVENTION

The present invention relates to a drive device for a transport means changing system, to a use of such a drive device for the autonomous mobile performance of work activities, in particular traffic-independent, greenkeeping, clearing, maintenance and/or monitoring work, and to a transport means changing system having a plurality of such drive devices.

TECHNICAL BACKGROUND

Although the present invention and the ideas on which the present invention is based are explained in more detail below with reference to passenger transport systems, the present invention is not limited thereto, but is applicable to a wide variety of transport systems, including, for example, cargo transport systems.

Conventional transport means changing systems are based on the basic idea of transporting passenger transport or cargo transport cabins with different transport modules. For example, DE 10 2018 002 229 A1 describes a transport means changing system in which a passenger cabin forms part of a modular vehicle and may be mechanically coupled to a flight module or a road vehicle module or another transport module as required.

Such conventional road vehicle modules are configured exclusively for the specific function of transporting passenger cabins. Thus, for example, a very large number of road vehicle modules must be kept available at peak traffic periods, during which there is a high requirement for transport services for passenger cabins, but which are only partially required for a large part of the remaining time, in particular during off-peak periods.

SUMMARY OF THE INVENTION

In view of the above, there is a need to provide an improved drive device for a transport means changing system.

According to the present invention, this object is achieved by a drive device and/or by a use and/or by a transport means changing system which is comprised in the claims.

Accordingly, the present invention provides:

A drive device for a system for changing means of transportation, comprising: a drive train which is configured for use on the road; an interface which is configured for coupling to a passenger cabin and/or cargo cabin and/or other trailer modules; comprising a work device which is configured to perform work activities, in particular maintenance, clearing, servicing and/or monitoring activities which are independent of transportation, wherein the drive device has a first operating mode in which it is coupled to at least one passenger cabin and/or cargo cabin and is configured to carry out autonomous transportation of passengers and/or cargo, and wherein the drive device has a second operating mode in which it is decoupled from a passenger cabin and/or cargo cabin and is configured for autonomous mobile performance of the work activities by the work device or by a coupled tool module.

A use of an autonomous drive device of a transport means changing system for the autonomous mobile performance of, in particular traffic-independent, greenkeeping, clearing, maintenance and/or monitoring work.

A transport means changing system comprising a plurality of drive devices each of which may be configured for autonomous passenger and/or cargo transport or for autonomous work performance, wherein a central controller of the transport means changing system dynamically configures the drive devices distributed in an area as a function of a transport requirement and a work requirement which requirements exist in the area.

The software used by the control system to control the drive devices as a function of the transportation and/or work requirement is scalable, i.e., the software is the same for all geographic areas of operation or regions.

In one possible embodiment, the transport device exchange system has an IoT payment system that settles transport services or work services to users, in particular using cryptocurrencies.

One of the findings on which the present invention is based is that traffic rush hours exist for transport means changing systems at which traffic rush hours an increased number of drive devices is required for transporting people and/or goods, but which must otherwise be kept on standby unused for a predominant part of their operating times outside of the traffic rush hours.

One idea on which the present invention is based is to make use of these standby periods and to design the drive devices of a transport means changing system in such a way that they may be used outside traffic rush hours, i.e. during periods in which they are not required for transporting passengers or goods, for carrying out maintenance, clearing and/or servicing work or also for monitoring work.

Therefore, the efficiency of a multimodal transport means changing system may be increased, since each drive device may thus autonomously perform independent activities during off-peak or stand-by periods, in particular as an autonomous mobile working robot.

According to the present invention, the drive device is configured in such a way that it may also autonomously and freely perform other functions or activities apart from the primary transport activities. In an urban environment, such other functions may include, for example, street cleaning, surveillance activities, grass verge cutting, repairs, waste emptying or disposal, or the like. For this purpose, the drive device is equipped with a sensor system suitable for such activities, and with suitable tools, for example robot arms. If necessary, the drive device may also be coupled at its mechanical interface, which becomes free in the second operating mode due to the decoupling from the passenger or cargo cabin, with a tool module or work module suitable for the respective work process. In particular, the drive device is configured in such a way that it couples completely independently to a tool module when required, and also decouples again if it is needed for passenger and/or cargo transport. The drive device is thus configured to switch automatically between the first operating mode and the second operating mode as required.

In contrast to existing concepts, the drive device according to the present invention may thus be used for a wide variety of applications, and may be coupled with different types of passenger and/or cargo cabins, as well as coupled with different types of tool modules, and may thus always be used as required for different purposes or activities.

Requirement management is preferably carried out by means of a cloud-controlled smart city system, which provides a central service for activity distribution. The activities to be performed are carried out by a work device, preferably fully autonomously, in particular controlled by means of artificial intelligence. In a possible embodiment, a controller integrated in the drive device has an artificial intelligence module AIM for autonomous control of work activities performed by the work device. For this purpose, the artificial intelligence module AIM nay evaluate environmental data, in particular camera images generated by a sensor system.

In the first operating mode, the drive device may couple with a dedicated cargo cabin, a dedicated passenger cabin or with a combined passenger and cargo cabin.

The cargo cabins have, for example, cabins for so-called last mile delivery. Furthermore, the cargo cabins may be configured for food or shopping delivery or for the sale or distribution of goods. Furthermore, cargo cabins may be provided in the form of standard containers on flat-bed trailers or the like.

The passenger cabins may also be categorized in different classes of passenger cabins, ranging from ultra-short-haul modules with standing room to minibus modules including, for example, up to fifteen passenger seats, cab modules with two to six seats for shorter distances, and luxury travel modules with large-capacity cabins for short distances or long distances with, for example, two to six seats. Special cabins for a wide variety of needs are also conceivable, for example cabins for leisure activities such as wellness, parties or video games, or even for animal transport, for example.

Combined passenger and cargo cabins may be used, for example, by tradesmen who want to transport both people and materials to their customers.

In the second operating mode, in which the work device of the drive device is active and the electromechanical interface of the drive device is decoupled from a passenger cabin and/or cargo cabin, the interface may also be used to accommodate or couple a tool module which supports the drive device in the respective planned activity or which is particularly configured for this purpose.

According to the present invention, particular importance is directed to the sensory system of the drive device, which enables the drive device to operate completely autonomously, and differs in particular with regard to its design from the sensory system of a drive device which is configured purely for transport. Accordingly, the sensor system is not only arranged and configured for autonomous driving in road operation but also for fully autonomous performance of all kinds of work. In addition, the sensor system may also be used for communication with natural persons.

A suitable mechanical connection device, for example a jaw hook connection, a detachable snap-in connection, a magnetic coupling or the like, may be provided for coupling the drive device to a passenger or cargo cabin or to a tool module. If necessary, the drive device may incline, in particular for hooking in a jaw hook during the coupling process. Alternatively, the interface of the drive device may also be configured to move relative to a substructure of the drive device. For example, a jaw hook itself may be configured to be movable and incline for hooking and unhooking.

Simultaneous to the mechanical coupling, an associated electrical power and/or signal connection or coupling is preferably provided by means of the interface of the drive device.

The trailer modules coupled to the drive device, i.e. tool modules or passenger or cargo transport modules, may be equipped with their own drive motors, in particular electric motors, and batteries.

Advantageous embodiments and further configurations result from the dependent claims as well as from the description with reference to the figures of the drawing.

According to an embodiment, the drive device has a central sensor unit which forms a highest point of the drive device in the second operating mode. In this way, the sensor unit is suitably positioned for the second operating mode, i.e. for performing maintenance, clearing, servicing and/or monitoring work, i.e. it is raised upwards for an all-round view.

According to an embodiment, the sensor unit is configured to be displaceable in position. In the first operating mode of the drive device, its sensor unit may be inserted or integrated in an aerodynamically favourable position in a vehicle shell of the drive device and/or the passenger and/or cargo cabin. In this way, the aerodynamic resistance is reduced for the transport operation, and thus the efficiency during transport is improved. Nevertheless, the sensor technology of the sensor unit may also be used in the first operating mode for autonomous driving. In the second operating mode, the sensor unit may be displaced upwards so that the sensor unit protrudes upwards in a raised manner and forms a head of the drive device. In this way, the sensor unit is suitable for performing maintenance, clearing, servicing and/or monitoring work, as it is located at a highest point on the drive device. In this way, the drive device is advantageously configured in the manner according to the present invention for the different operating modes, and may thus be used flexibly for autonomous transport tasks as well as for autonomous performance of work. In addition, the drive device for performing work may thus also be integrated more easily into an environment of natural persons, since the sensor unit formed as a head provides a point of contact at the eye level of a natural person, so that intuitive interaction with the drive device is facilitated for natural persons.

According to an embodiment, the work device has a swivel arm for displacing the sensor unit, which is coupled to a substructure also containing the drive train by means of a swivel bearing positioned in the area of a front side of the drive device. In this way, a particularly simple and robust solution is advantageously provided for adjusting the sensor unit. In the first operating mode, the sensor unit is preferably accommodated at least partially into a vehicle shell or body, for which purpose a corresponding recess is preferably provided. The positioning of the sensor system is still arranged at a sufficient height for autonomous driving. For example, in addition to short-haul operation in urban areas, this configuration is also suitable for long-haul operation or higher speeds, since the sensor unit, which is partially recessed in the vehicle body, enables an aerodynamically advantageous and thus energy-saving transportation. As soon as the passenger and/or cargo cabin is decoupled from the drive device, the sensor unit folds forward or upward, and is thus arranged raised upward on the front side of the drive device in the manner of a head. The sensor unit is positioned or configured in this raised position in accordance with the increased sensory requirements for autonomously performing or carrying out work and/or for communicating with persons which are nearby.

According to a further embodiment, the sensor unit may be configured to be fixed in position, wherein the sensor unit forms a head on a front side of the drive device, which head protrudes upwardly in the second operating mode. In this embodiment, the sensor unit is always, i.e. also in the first operating mode, arranged in this raised position. For example, this may be intended for transporting a passenger and/or cargo cabin in inner-city traffic, where aerodynamic efficiency of a vehicle does not play a predominant role.

According to an embodiment, a man-machine interface is provided in the area of the sensor unit, which has a display device configured for visual communication with persons. In particular, the display device may be configured to imitate human facial expressions, and thus interact with natural persons which are encountered by the drive device, in particular when performing work. For example, the display device may have at least an imitation of human eyes, whereby a variety of mimic gestures may already be displayed.

According to an embodiment, the work device of the drive device comprises mechanical working tools, in particular at least one gripper arm, which are configured for performing maintenance, clearing and/or servicing. In particular, the mechanical working tools may be universal working tools that may be used for a wide variety of tasks.

The work device of the drive device is preferably also configured to be equipped with an additional tool or work module for special activities, which includes a mechanical interface and may be controlled by means of the work device. Thus, according to an embodiment, the electromechanical interface of the drive device is also configured for coupling with a work device, in particular a tool module. In this way, the drive device may be advantageously configured as a specialized autonomous working robot for a wide variety of applications in the second operating mode by means of the interface.

According to an embodiment, the work device of the drive device or of a tool module to be decoupled is configured for road cleaning. Optionally or additionally, the work device may also be configured for road maintenance. In particular, a road cleaning and/or road maintenance module may be coupled to the mechanical interface of the drive device for this purpose and may be controlled by means of the control system of the drive device and/or its own local control system. For example, a street sweeping brush, a collection container for sweepings, equipment for closing-off detected road damages or the like may be provided as tools in the road maintenance module. In this case, a suitable robot arm may also be provided for inspection or closing-off work. In this way, the drive device may be advantageously configured as an autonomous road cleaning and/or road maintenance robot.

According to an embodiment, the work device of the drive device or of a tool module to be coupled thereto is configured for waste collection. Alternatively or additionally, the work device may be configured for emptying public waste containers. For example, for this activity, a waste collection module may be coupled to the mechanical interface of the drive device and controlled by means of the control system of the drive device. For example, the work device may be equipped with a gripper arm for emptying waste containers and with a container for picking up the waste. In this way, the drive device may advantageously be configured as an autonomous waste collection robot.

According to a further embodiment, the work device of the drive device or of a tool module to be coupled thereto is configured for greenkeeping. For example, a greenkeeping module may be coupled as a tool module to the mechanical interface of the drive device and may be controlled by means of a controller of the drive device. For example, this module may have a robot arm configured for tree cutting and a green waste collection container. In this way, the drive device may be advantageously configured as an autonomous greenkeeping robot.

According to a further embodiment, the work device of the drive device or of a tool module to be coupled to it is configured for safety monitoring. The sensor unit of the drive device may have specially configured sensors for safety monitoring. For example, camera systems configured for monitoring activities and an artificial intelligence module configured for identifying hazards may be provided. In this way, the drive device or a monitoring module coupled thereto may directly assume safety monitoring activities in the second operating mode, and may thus be used as an autonomous monitoring robot. For example, drive devices may be used for building surveillance, patrolling or the like.

The above embodiments and further configurations may be combined with each other as desired, if useful. Further possible embodiments, further configurations and implementations of the invention also comprise combinations, not explicitly mentioned, of features of the invention described above or below with respect to the exemplary embodiment. In particular, the skilled person prefers to add single aspects as improvements or additions to the respective basic form of the present invention.

BRIEF DESCRIPTION OF THE DRAWINGS

The present invention is explained in more detail below with reference to the exemplary embodiments given in the schematic figures of the drawings, wherein.

Figure 1:
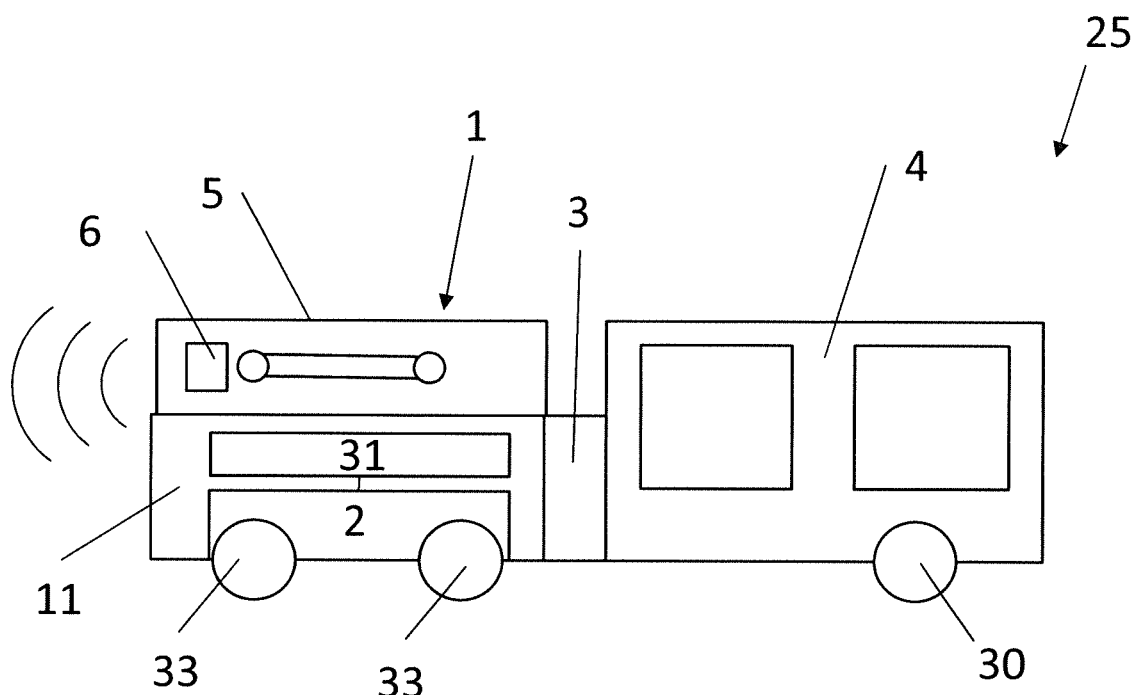
FIG. 1 is a schematic representation of a drive device in a first operating mode.

The accompanying drawings are intended to provide a further understanding of embodiments of the invention. They illustrate embodiments and, in connection with the description, serve to explain principles and concepts of the invention. Other embodiments and many of the advantages mentioned will be apparent with reference to the drawings. The elements shown in the drawings are not necessarily shown to scale with respect to each other.

In the figures of the drawing, the same elements, features and components, which have the same function and act in the same way, are each identified with the same reference signs, unless otherwise stated.

DETAILED DESCRIPTION OF EXEMPLARY EMBODIMENTS

FIG. 1 shows a schematic representation of an autonomous drive device 1 in a first operating mode, i.e. with a coupled passenger cabin or cargo cabin 4.

The autonomous drive device 1 is preferably configured as an autonomously driving system that has sensor equipment or sensor technology suitable for autonomous driving and, in particular, artificial intelligence configured for autonomous driving. Furthermore, the autonomous drive device 1 preferably has transceivers, in particular car-to-car and car-to-x communication devices, as well as a cloud connection suitable for the coordination of autonomous systems.

Figure 11:
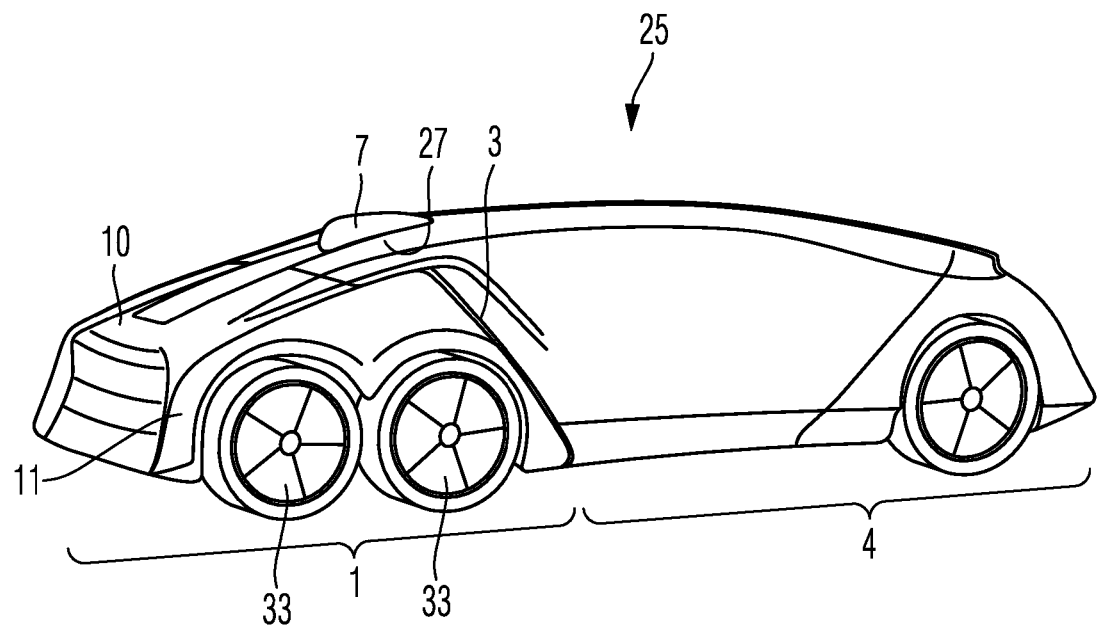
FIG. 11 is a perspective view of a transport vehicle with a drive device and a crane according to a further embodiment in the first operating mode.
Figure 17:
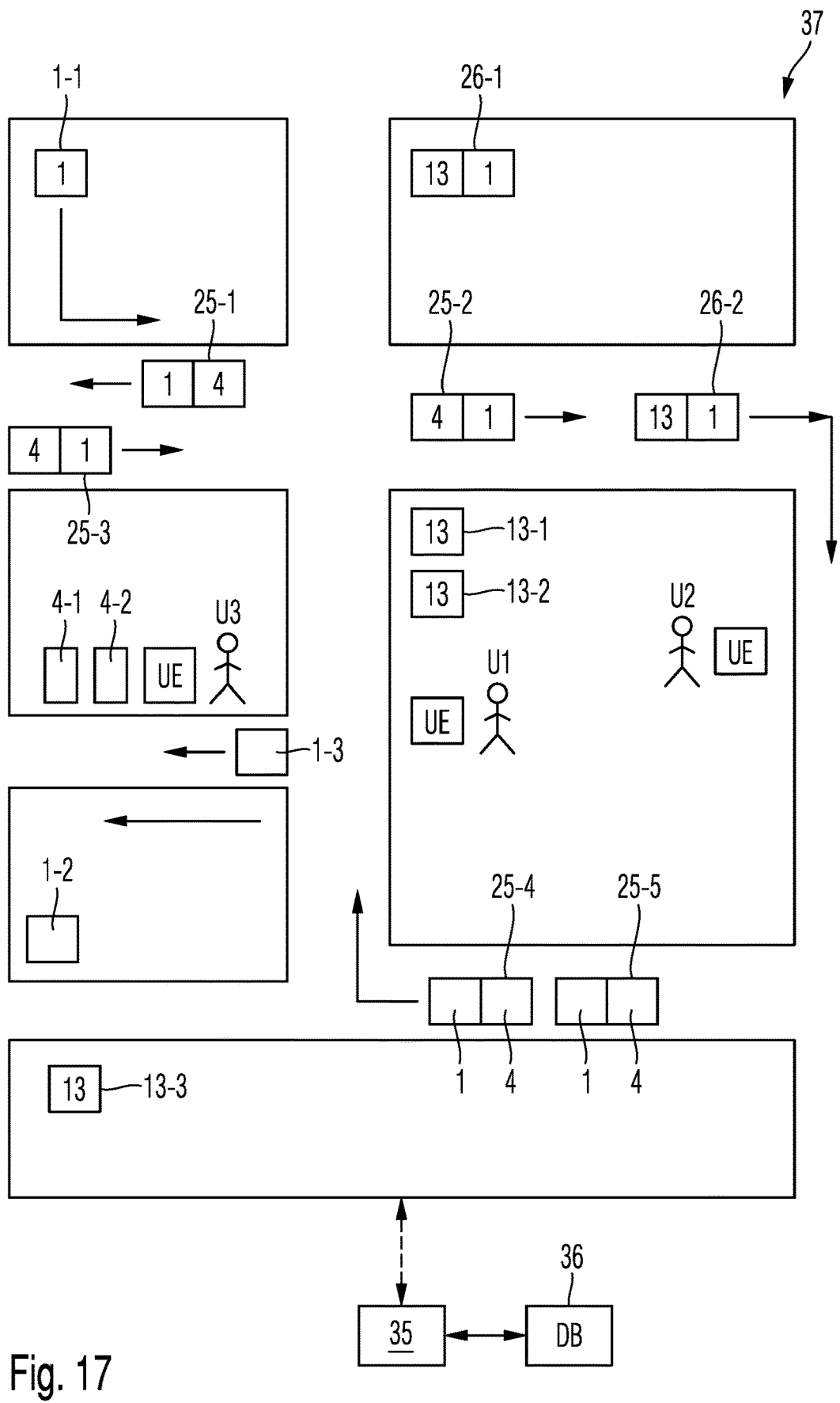
FIG. 17 is a schematic view explaining the transport vehicle changing system according to the present invention.

The drive device 1 is configured as a modular drive device of a transport means changing system 37. FIG. 17 schematically shows an example of such a transport means changing system 37. Accordingly, it has a mechanical and/or electromechanical interface 3 configured for coupling with at least one passenger cabin and/or cargo cabin 4. The drive device 1 together with the passenger cabin and/or cargo cabin 4 together form a transport vehicle 25 as shown in FIGS. 1, 11. Multiple drive devices 1 may be coupled by means of interfaces to increase tractive effort in one possible embodiment.

Both the drive device 1 and the cabin 4 are shown symbolized as boxes only in FIG. 1. The real drive device 1 and the real cabin 4 are preferably not rectangularly shaped, but shaped according to usual safety regulations required in road traffic, usual requirements for aerodynamic efficiency and also under design aspects, as shown in FIG. 11.

In the embodiment shown schematically in FIG. 1, the drive device 1 is coupled by means of the interface 3 to a passenger cabin 4 with windows shown schematically. The interface 3 is also shown in FIG. 1 only schematically symbolized by a box. Different implementations of mechanical interface types are possible. In particular, it may be an interface 3 for articulated or for rigid coupling. Preferably, an electrical interface is also integrated in the interface 3, which is configured for power and/or signal transmission. Mechanical coupling devices, for example by means of jaw hooks, are known to a person skilled in the art from the prior art and are not described separately here.

The area of the interface 3 may be configured both the drive device 1 and the cabin 4 in a variety of ways. Preferably, they are complementary housing shapes so that the drive device 1 and the cabin 4 together form a vehicle with a uniform external appearance. For example, the contact surfaces of the cabin 4 and the drive device 1 may be formed obliquely in the area of the interface 3 to facilitate coupling, as may be seen in FIG. 11.

The drive device 1 has a drive train 2 that is configured for autonomous road use. In particular, it may be an electric drive train 2 integrated with all components, for example a battery, power electronics and an electric motor, in a substructure 11 of the drive device 1. The drive train 2 may also have an automatic steering or control system.

The drive train 2 may, among other things, have a chassis suitable for road use and compensating for road unevenness, as well as wheels 33 suitable for road use. Furthermore, the drive train 2 is preferably characterized by a driving and braking performance sufficient for road use as well as weather resistance.

The drive device 1 also has a work device 5, which is also shown only schematically in FIG. 1. The work device 5 is configured for carrying out maintenance, clearing, servicing and/or monitoring work independent of traffic. For this purpose, the drive device 1 has a sensor unit 6 configured for such work or activities. Such a sensor unit 6 may include, for example, camera, radar, lidar, thermal, air pressure, humidity, acceleration, force measurement sensor systems or the like. The sensor unit 6 may be integrated into the work device 5 of the drive device 1.

Figure 2:
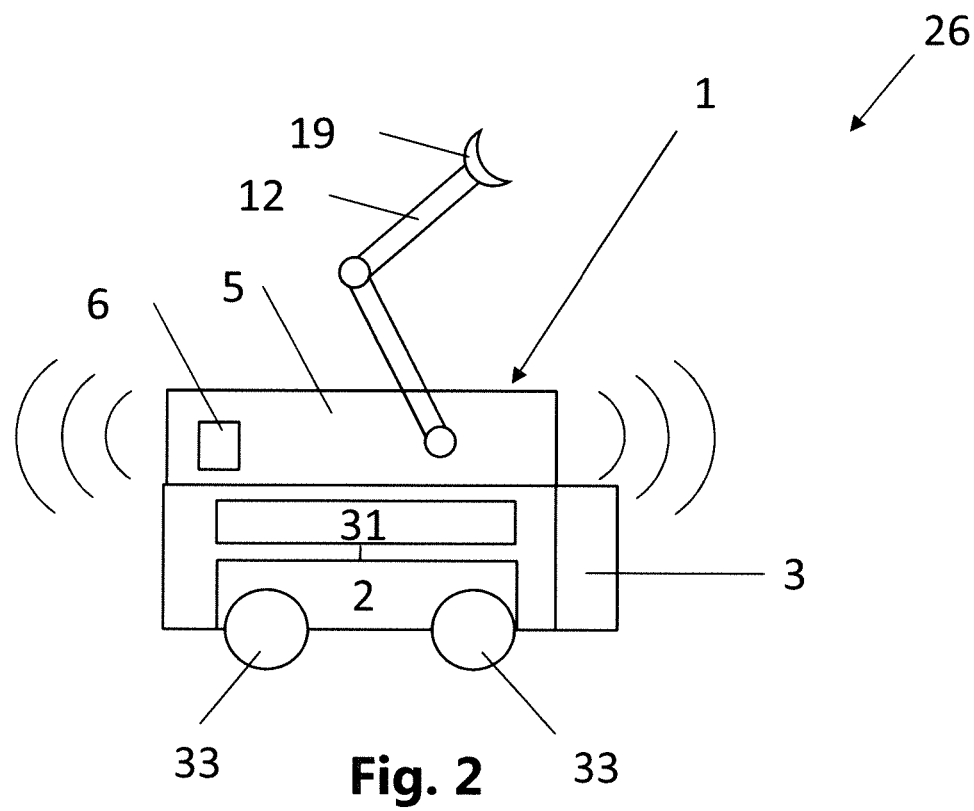
FIG. 2 is a schematic representation of the drive device according to FIG. 1 in a second operating mode.

Optionally, as schematically indicated in the illustrated embodiment according to FIG. 2, a universal mechanical working tool may also be provided as part of the work device 5, for example a universal gripping arm 12 configured to perform maintenance, clearing and/or servicing. For example, it may be a multi-axis robotic arm 12 with a gripping actuator 19.

The drive device 1 preferably has a control device 31 which is configured for autonomous control of the activities carried out in the second operating mode. The control device 31 receives sensor data and sensor signals from sensors of the sensor unit 6.

Furthermore, software modules of the control device 31 may be provided, which control the autonomous operation of corresponding tool modules 13 that may be coupled to the mechanical interface 3 and/or of tools of the work device 5.

In the first operating mode shown in FIG. 1 and FIG. 11, the drive device 1 is coupled to the passenger and/or cargo cabin 4. In this case, the systems of the work device 5 are configured for autonomous passenger and/or cargo transport. In particular, all tools, connections for working tools or the like are inactive and/or stowed in this first operating mode in a manner permissible for road operation. In particular, further, the sensor system of the drive device 1 is configured for autonomous road transport operation. In the embodiment shown, this is symbolized by a forwardly directed indicated sensory scanning by the sensor device 6.

The passenger and/or cargo cabins 4 shown here only in schematic form may be cabins of different design. For example, cargo cabins 4 may be cabins for last mile delivery. Furthermore, cargo cabins 4 are for example configured for food or shopping delivery or for the distribution of other goods. Furthermore, classic cargo cabins may be provided, for example in the form of standard containers on flat-bed trailers or the like. Cargo cabins 4 may be configured in such a way that they can accommodate smaller cargo cabins 4 or passenger cabins 4 and also inactive drive devices 1.

Passenger cabins 4 may be of various types, ranging from short-haul modules with standing room, minibus modules with, for example, up to fifteen seats, cab modules with, for example, two to six seats for shorter distances, to luxury travel modules with large-capacity cabins with two to six seats for long-haul operations. Special passenger cabins for a wide range of applications are also conceivable, for example cabins for leisure activities such as wellness, festive events or video games.

FIG. 2 shows a schematic representation of the drive device 1 according to FIG. 1 in a second operating mode.

To reach the second operating mode, the passenger cabin and/or cargo cabin 4 is decoupled from the drive device 1 by releasing the interface 3. If the interface 3 is a jaw hook, the cabin 4 may be raised in the area of the interface 3 by means of support feet. Alternatively or additionally, the drive device 1 may be lowered in the area of the interface 3, for example by means of a level-adjustable trolley. This disengages the interface 3. The drive device 1 can then be moved and assume a state decoupled from the crane 4, i.e. the second operating mode for performing work activities.

The work device 5 with the working tools and/or a coupled tool module 13 may also have integrated sensors that transmit data to the control 31 of the drive device 1 by means of a data bus or the electromechanical interface 3.

In the second operating mode, the drive device 1 is mechanically and/or electrically decoupled from a passenger cabin and/or cargo cabin 4 and configured for autonomous mobile performance of traffic-independent maintenance, clearing and/or monitoring work or other work activities. In particular, the sensory and acoustic systems of the work device 5 are configured to perform such work. Accordingly, the sensor unit 6 of the drive device 1 is aligned for the respective work activity and in particular for the entire environment of the drive device 1, which is symbolized in FIG. 2 with sensory scans indicated directed to all sides by the sensor unit 6 integrated in the work device 5. The tools required to perform the activity, such as a gripper arm 12, are extended and active in the second operating mode. Furthermore, connections for any connected tool modules are active.

A tool module with working tools may be directly attached to the drive device 1 by means of an interface and form part of the work device 5 or may be coupled to the drive device 1 as a work attachment module 13.

In this second operating mode, the drive device 1 thus serves as an autonomous working robot 26 that is configured and configured to perform traffic-independent work or activities in an autonomous and mobile manner. For example, the drive device 1, in particular its work device 5, is configured in the second operating mode specifically for servicing, clearing work, servicing or, if necessary, monitoring work. Such activities will be discussed in more detail with reference to FIGS. 4 to 7.

Figure 3:
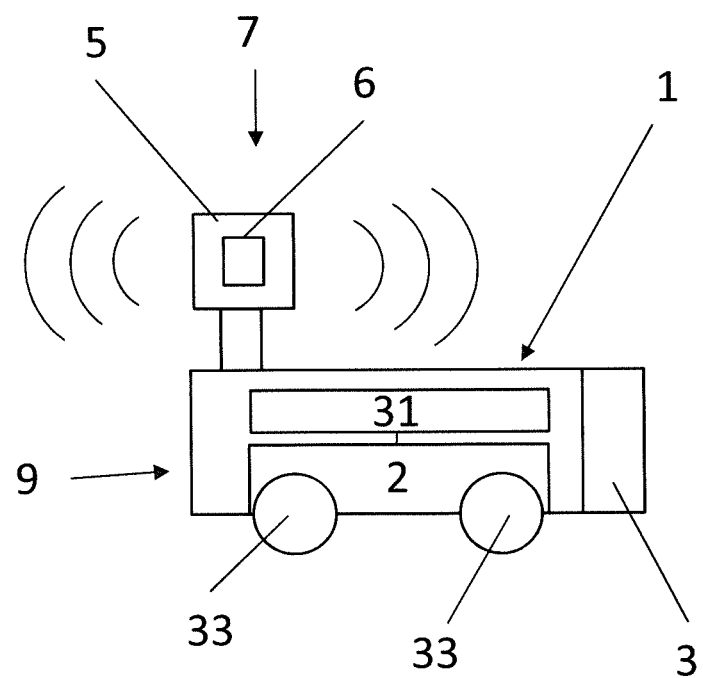
FIG. 3 is a schematic representation of a drive device according to an embodiment in a second operating mode.

FIG. 3 shows a schematic representation of a drive device 1 according to a further embodiment in a second decoupled operating mode.

The work device 5 of the work device 1 shown in FIG. 3 has a sensor unit 6, which forms a highest point of the drive device 1 in the second operating mode. At this elevated position, the sensor unit 6 supplies sensor data, in particular camera images of the environment, to the controller 31 of the drive device 1.

In FIG. 3, the sensor unit 6 is configured to be fixed in position, with the sensor unit 6 forming a head 7 of the drive device 1 on a front side 9 of the drive device 1, which head 7 protrudes upwards in the second operating mode. In this way, the sensor unit 6 is arranged in a position suitable for carrying out maintenance, clearing, servicing and/or monitoring work, for example at the head height of a human being, in order on the one hand to enable communication at eye level and on the other hand to have the greatest possible overview of the surroundings of the drive device 1.

In the embodiment shown in FIG. 3, the control unit 31 is configured to monitor and control a tool module 13, which may be coupled to the interface 3 of the drive device 1, on the basis of sensor data. Depending on the type of work to be performed, different tool modules 13 may be coupled. Furthermore, the mechanical interface 3 is configured for coupling to a work device in the form of a tool module 13 which may be coupled to the drive device 1 in the second operating mode.

Figure 4:
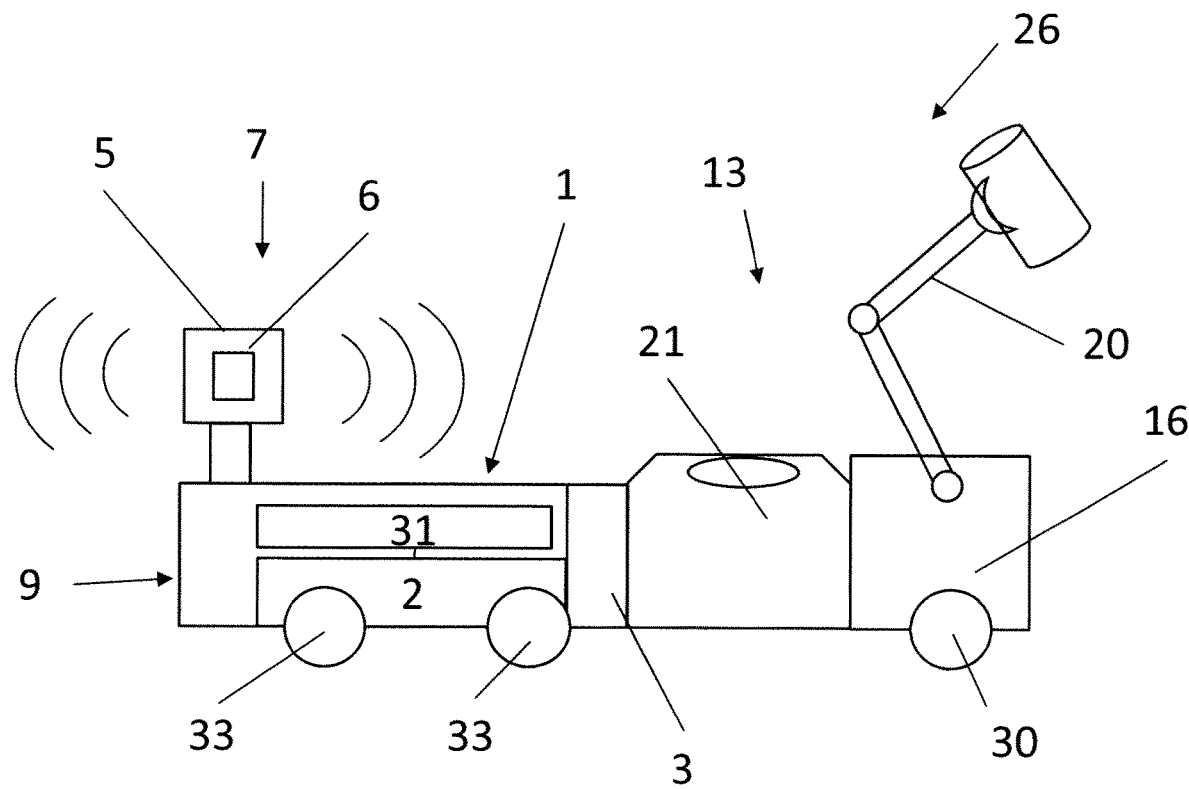
FIG. 4 is a drive device coupled with a tool module according to an embodiment.

In FIG. 4, the tool module 13 is configured as a waste collection module 16, which has a gripper arm 20 and a collection container 21. The gripper arm 20 is configured to receive waste containers, and is configured to introduce a waste content of waste containers into the collection container 21 of the waste collection module 16. In one embodiment, the tools of the tool module 13 may be directly controlled by means of a control bus by the control 31 of the coupled drive device 1. Alternatively, the tool module 13 has its own local control or controller for controlling its tools.

The sensor unit 6 is configured to detect waste containers located in the vicinity of the drive device 1, to detect a fill level of a waste container and/or, in the case of a sensor-equipped and networked waste container, to communicate with the waste container with respect to its current fill level. Furthermore, the sensor unit 6 is configured to supply sensor data to a controller 31 of the drive device 1, which controls the waste collection module 16 and in particular this gripper arm 20 for emptying a waste container by means of the interface 3. Once a predetermined fill level has been reached, the respective waste bin is approached autonomously by the drive device 1 and emptied into the collection container 21 by means of the gripper arm 20.

For example, the waste collection may be performed until the collection container 21 of the waste collection module 16 is full. Subsequently, the drive device 1 can transport the waste collection module 16 of the coupled tool module 13 autonomically to a collection point, copy it there, and then use it again for coupling with a person and/or cargo cabin 4 or for performing another greenkeeping, clearing, maintenance and/or monitoring work. In particular, a new activity may be directly assigned to the drive device 1 by means of a cloud connection. For this purpose, the drive device 1 preferably has a communication module for establishing a wireless communication link with an access point of a data network, which is connected to a central control of a transport means changing system.

Figure 5:
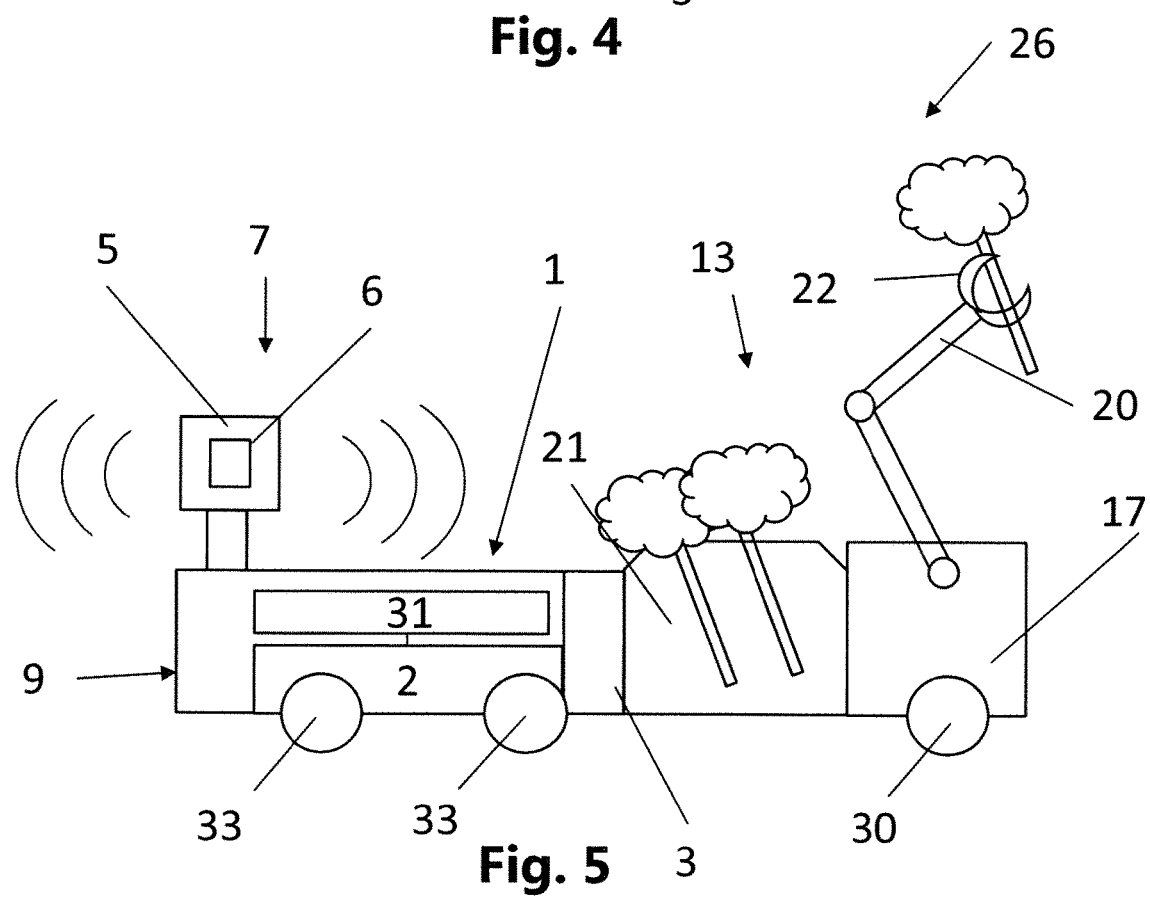
FIG. 5 is a drive device coupled to a tool module according to a further embodiment.

FIG. 5 shows a drive device 1 coupled to a tool module 13 according to a further embodiment.

According to this embodiment, a greenkeeping module 17 is coupled to the mechanical interface 3. The greenkeeping module 17 differs from the waste collection module 16 essentially in the design of its individual components, in particular the gripper arm 20 and the collection container 21.

The work device 5 is preferably configured for greenkeeping. In particular, the sensor unit 6 is configured to detect, for example, a growth condition of trees and shrubs in the vicinity of the drive device 1, to compare it with a target condition, and, if the growth condition exceeds the target condition, to control the gripper arm 20 to remove green material. For this purpose, the gripping arm 20 has a branch shear actuator 22. In the embodiment shown in FIG. 5, the collection container 21 is preferably configured to receive green cuttings.

Figure 6:
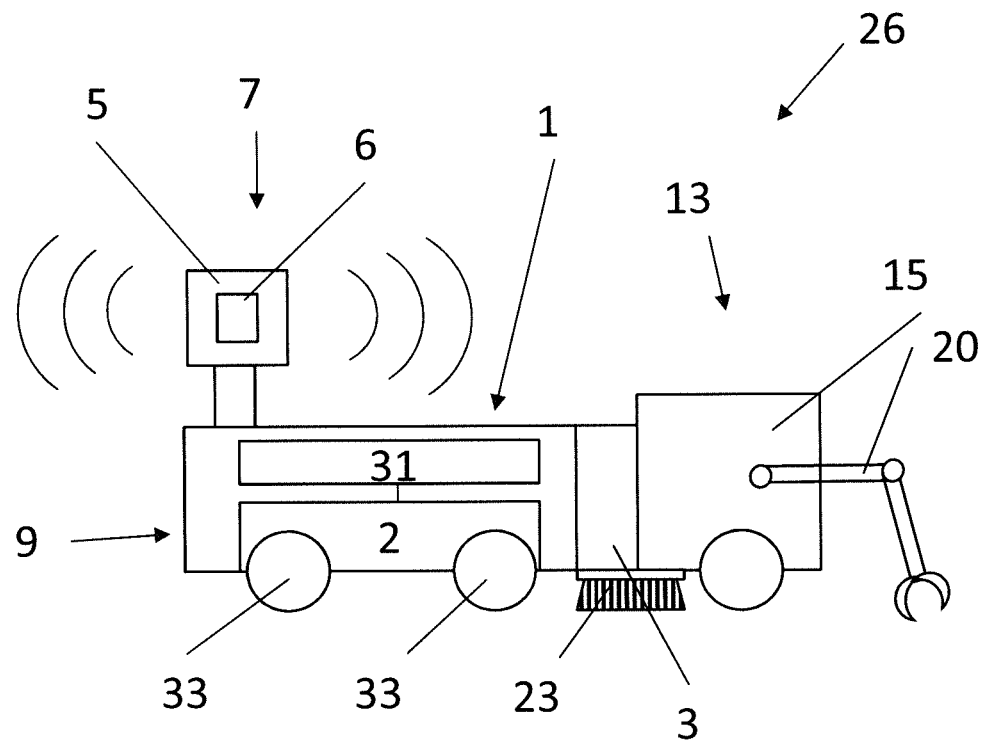
FIG. 6 is a drive device coupled to a tool module according to a still further embodiment.

FIG. 6 shows a drive device 1 coupled to a tool module 13 according to a further embodiment.

The tool module 13 according to FIG. 6 is configured as a road maintenance module 15 and is coupled to the electromechanical interface 3 of the drive device 1. The sensor unit 6 of the drive device 1 is here preferably configured to detect a state of contamination or damage of roads on which the drive device 1 moves autonomously. For example, a suitable camera and a correspondingly configured image processing software module are provided for this purpose. In one possible embodiment, the sensor unit 6 has a surround view system with fisheye cameras.

The road maintenance module 15 shown in FIG. 6 has a cleaning device 23 as a special tool module 13, for example in the form of a road sweeping brush, which is configured for road cleaning.

If an increased state of contamination of a road is identified by means of the sensor data supplied by the sensor unit 6, the control 31 of the drive device 1 controls the drive train 2 of the drive device 1 to approach the road sections to be cleaned and activates the cleaning device 23 of the tool module 13 coupled to the drive device 1 by means of the interface 3 when the road sections to be cleaned are reached.

In addition, the road maintenance module 15, as the coupled tool module 13, also has a gripper arm 20, which is configured to collect larger contaminated objects from the ground of the road to be cleaned. In addition, the gripper arm 20 may be configured for the temporary removal or blocking off of sensor-detected road damage. When damage is detected, the gripper arm 20 may be actuated by the controller 31, for example, to take preparatory measures, such as blocking off the detected damage location with spacer elements stored in the road maintenance module 15 of the coupled tool module 13, or the like. Such damage may be reported to a central server of the transport means changing system by means of a cloud connection of the control 31 of the drive device 1. A central control of the transport means change system can instruct nearby other drive devices 1, which have suitable tools, to carry out a road repair, in particular by means of a road repair module.

Figure 7:
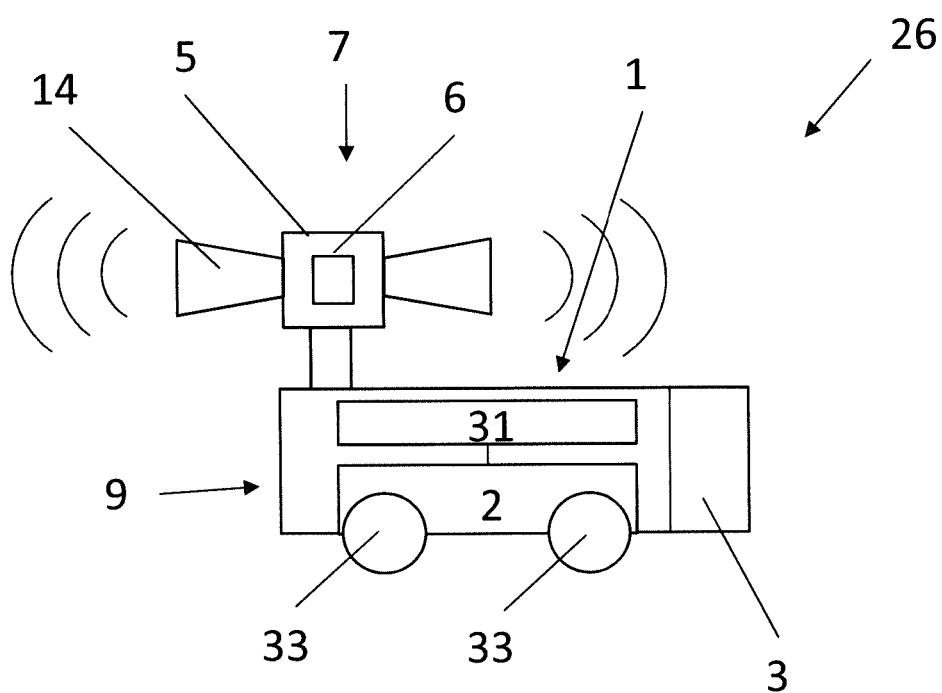
FIG. 7 is a schematic representation of a drive device according to a further embodiment in a second operating mode.

FIG. 7 shows a schematic representation of a drive device 1 according to a further embodiment in a second operating mode.

In this embodiment, the work device 5 of the drive device 1 is capable of performing monitoring activities as a working or monitoring robot 26 without an additional coupled tool module 13 and is preferably provided with suitable sensors 14 for safety monitoring. For example, particularly high-resolution cameras and/or cameras equipped with tele-optics may be provided as sensors 14, which permit detailed observations at a distance exceeding the requirements for autonomous driving. Alternatively or additionally, the sensors 14 may have thermal imaging cameras, night vision cameras or the like, which provide images whose quality exceeds the image quality required for autonomous driving.

The control device 31 may include an artificial intelligence module AIM to detect and extend potential hazards in the environment of the drive device 1.

In such a configuration, the drive device 1 in its second operating mode can, for example, use a surveillance drone for building surveillance, which is remotely controlled, for example wirelessly, by the control device 31 of the drive device 1 in its local environment.

Figure 8:
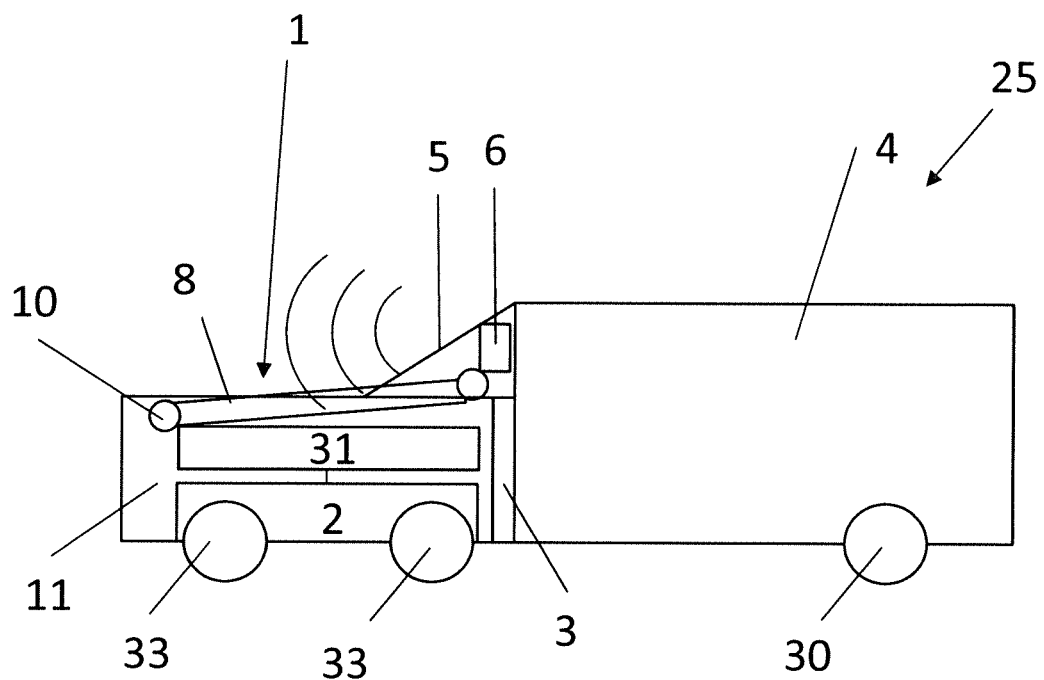
FIG. 8 is a schematic representation of a drive device according to a further embodiment in a first operating mode.

FIG. 8 shows a schematic representation of a drive device 1 according to a further embodiment in a first operating mode.

The embodiment shown in FIG. 8 differs from the embodiment according to FIG. 1 in particular in that the sensor unit 6 of the work device 5 is configured here to be positionally displaceable.

In the first operating mode of the drive device 1 shown in FIG. 8, the sensor unit 6 is integrated in an aerodynamically favourable position in a vehicle shell of the drive device 1 and the passenger and/or cargo crane 4. Exemplarily, the sensor unit 6 is arranged in the area of the interface 3 and functions as part of the vehicle shell as a spoiler, or transition element between the cabin 4 and the drive device 1.

In further embodiments, it is also possible for the sensor unit 6 to extend into the passenger cabin and/or cargo cabin 4 in the first operating mode and to be at least partially recessed or positively integrated therein, for example in the area of a windshield of a passenger cabin.

To displace the position of the sensor unit 6, the work device 5 of the drive device 1 has a swivel arm 8 which is coupled to the substructure 11 containing the drive train 2 of the drive device 1 by means of an actuator-adjustable swivel bearing 10 positioned in the area of a front side 9 of the drive device 1.

Figure 9:
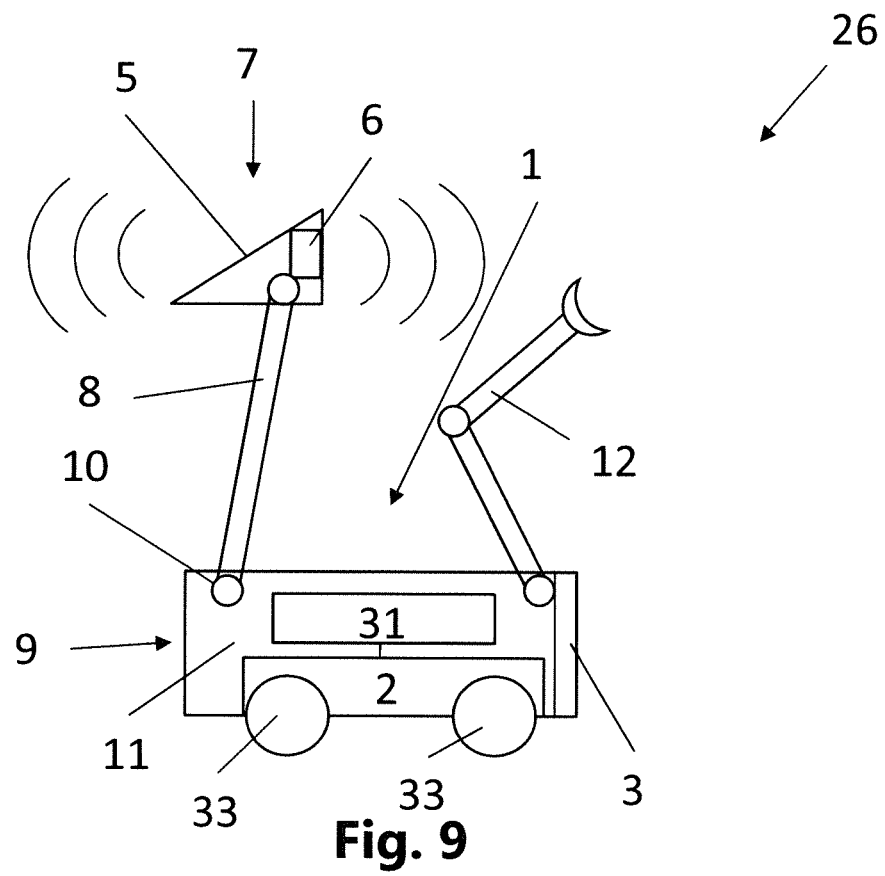
FIG. 9 is the drive device according to FIG. 8 in a second operating mode.

FIG. 9 shows the drive device 1 according to FIG. 8 in a second operating mode.

In the second operating mode, the drive device 1 is decoupled from the cabin 4, which may be done as described with reference to FIG. 2. In contrast to FIG. 2, however, the arrangement of the work device 5 additionally changes, since the pivot arm 8 is set up by pivoting about the pivot bearing 10 and in this way the sensor unit 6 is displaced upwards to a raised position in which it protrudes upwards and forms a head 7 of the drive device 1.

Optionally, the work device 5 may further comprise a gripping arm 12 that may be retracted into the base 11.

Figure 10:
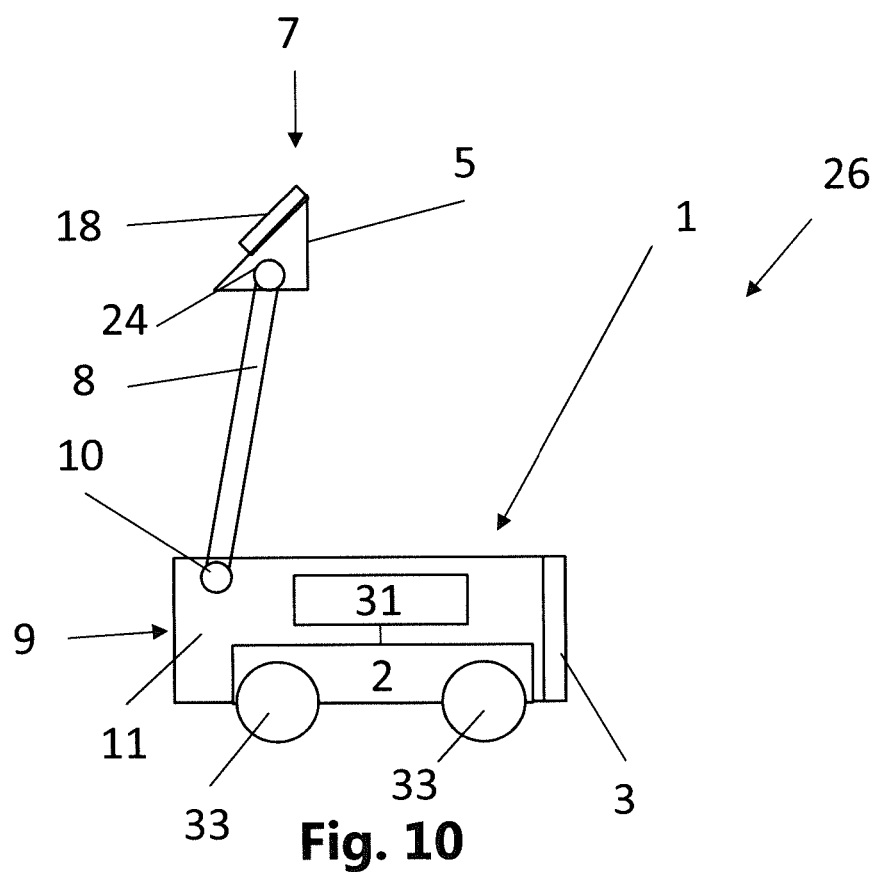
FIG. 10 is a schematic representation of a drive device according to a further embodiment in a second operating mode.

FIG. 10 shows a schematic representation of a drive device 1 according to a further embodiment in a second operating mode.

In this embodiment, a man-machine interface 18 is provided in the area of the sensor unit 6. This serves for communication with natural persons in the working environment of the activity to be performed. For example, a safety area for a workstation may be closed off in this way by requesting persons located there by means of the man-machine interface 18 to clear the safety area of the workstation. Furthermore, communication in road traffic is also possible by means of the man-machine interface 18 in the first operating mode, for example, communication for regulating the right of way is possible.

The man-machine interface 18 may be tilted to suit the situation by means of a second joint 24 of the head 7, which may be freely pivoted and rotated through 360°.

FIG. 11 shows a perspective view of a transport vehicle 25 with a drive device 1 and a cabin 4 according to a further embodiment in the first operating mode. In the embodiment shown here, the combination of drive device 1 and a passenger cabin 4 is a transport vehicle 25 for long-distance operation.

As explained with reference to FIGS. 8 to 10, the drive device 1 is configured with a position-displaceable head 7. The cabin 4 and the drive device 1 have an obliquely extending interface 3, with an upper region of the cabin 4 extending over the substructure 11 of the drive device 1. In the state of the head 7 integrated in the vehicle outer shell, the head 7 is displaced to the upper region 27 of the cabin 4 and is recessed in the upper region 27. In the first operating mode shown in FIG. 11, the head 7 is thus aerodynamically favourably integrated into the vehicle shell of the transport vehicle 25.

Figure 12:
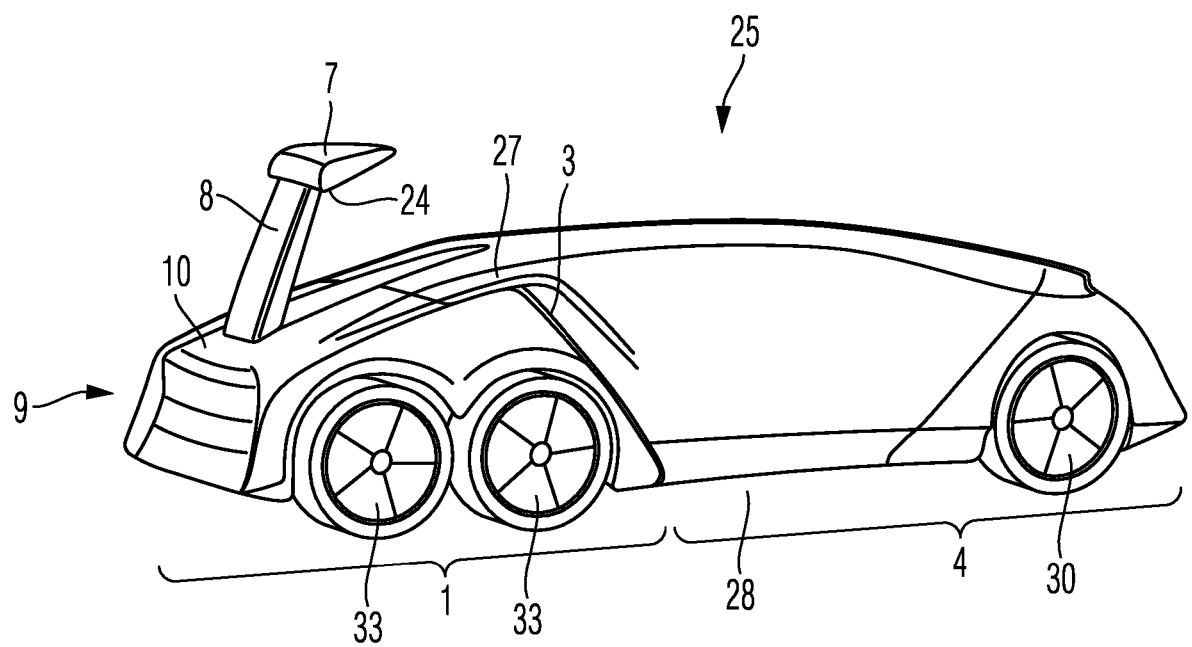
FIG. 12 is the transport vehicle according to FIG. 11 during the decoupling process for decoupling the drive device and the cabin.

FIG. 12 shows the transport vehicle 25 according to FIG. 11 during the decoupling of the drive device 1 and the cabin 4. For decoupling, the head 7 is first swivelled by means of the swivel arm 8 around the swivel bearing 10 located in the area of the front side 9 and thus lifted out of the upper area 27 of the cabin 4. Furthermore, the cabin 4 is supported for decoupling by extendable front supports 28. In this way, the cabin 4 is now statically secured and the positive lock between the drive device 1 and the cabin 4 may be released by decoupling the interface 3.

Figure 13:
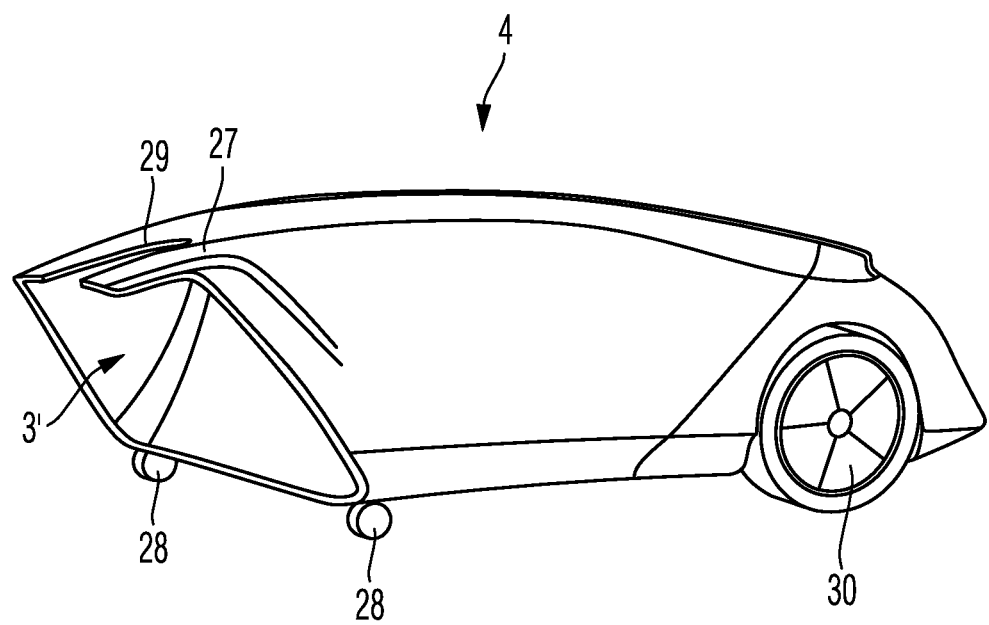
FIG. 13 is the decoupled cabin after the decoupling process according to FIG. 12.

FIG. 13 shows the decoupled cabin 4 after the decoupling process. The cabin 4 is now independently parked on its rear wheels 30 and front supports 28. The upper area 27 of the cabin 4 has a free recess 29, which is configured to integrate the head 7 in the first operating mode. FIG. 13 also shows the mating interface 3' of the cabin 4, which is configured for positive electromechanical coupling with the drive device 1.

Figure 14:
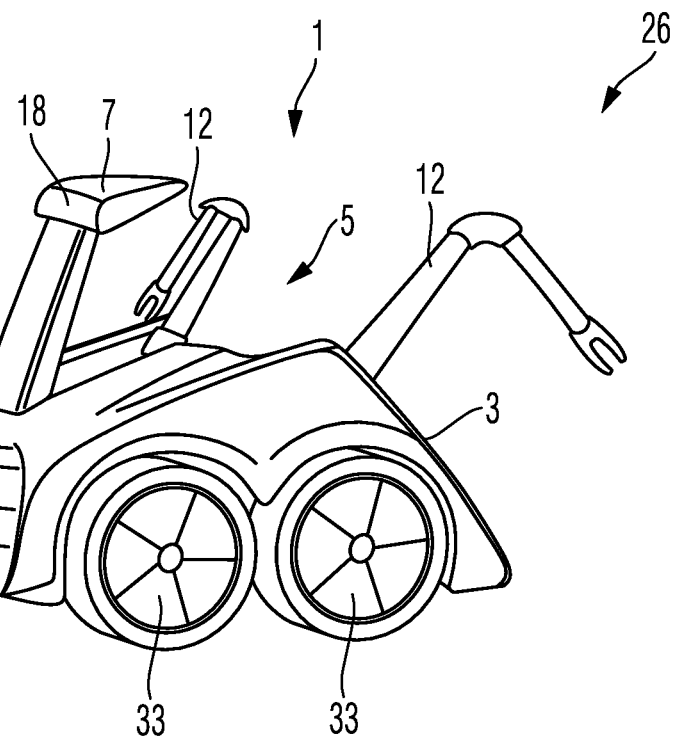
FIG. 14 is the decoupled drive device after the decoupling process according to FIG. 12 in the second operating mode.

FIG. 14 shows the decoupled drive device 1 according to FIG. 12 in the second operating mode after the decoupling process. In the embodiment shown, the work device 5 of the drive device 1 has two integrated universal gripper arms 12, which are configured to perform maintenance, clearing and/or servicing. The gripper arms 12 are mounted in a retractable manner in the area of the interface 3. In the first operating mode they are retracted in the interface 3 and in the second operating mode the gripper arms 12 are extended. The drive device 1 has four wheels 33 and may thus be moved dynamically in the second operating mode without the cabin 4. Furthermore, the four wheels 33 provide a safe footing for maintenance, clearing and/or servicing.

As already explained with reference to FIG. 10, the head 7 has a man-machine interface 18 including a display device. For visual communication with persons, the display device is configured to address persons in the vicinity of the drive device 1 emotionally. Here, for example, this is realized with the representation of a schematized eye area, which imitates human facial expressions. In particular, the swivel arm 8 also has a second actuator-free swivel joint 24, which may be used to support such a facial expression by nodding the head 7. The head 7 can preferably be rotated through 360°.

Figure 15:
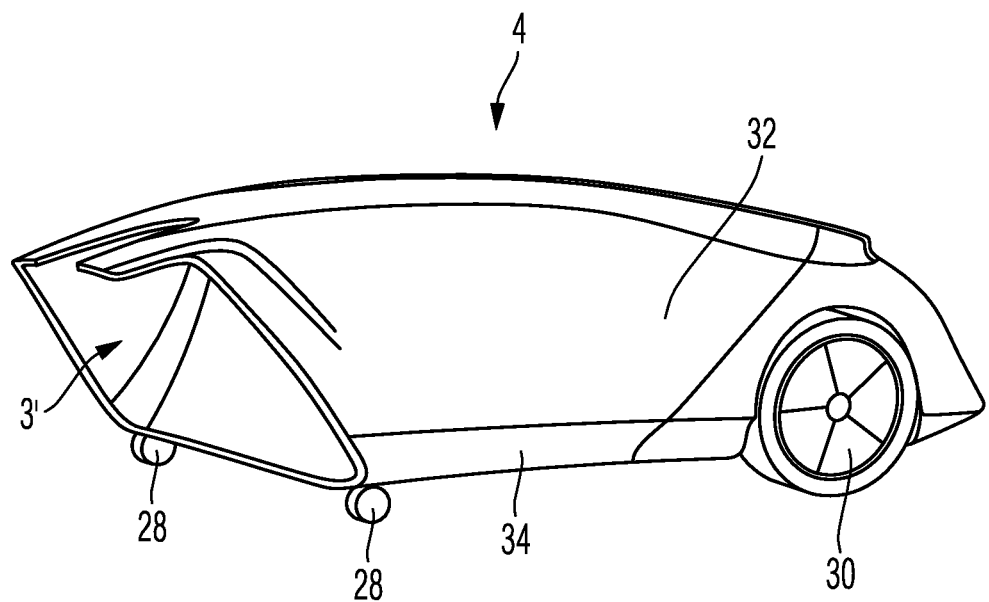
FIG. 15 is the cabin according to FIG. 13 during loading of the battery thereof.

FIG. 15 shows the cabin 4 according to FIG. 13 charging its battery 34, which may be charged by means of a charging station during parking. The passenger cabin 4 for long-distance operation has its own battery 34 and an auxiliary motor 32. In particular, the battery 34 may be coupled to the control unit 31 by means of the connection of the mating interface 3' to the interface 3. The battery 34 has a higher capacity than a battery of the drive device 1 and the auxiliary motor 32 has a higher drive power. In this way, long ranges and high cruising speeds of the transport vehicle 25 are possible in long-distance operation. Charging of the battery 34 takes place, for example, inductively in the parked state shown. For this purpose, the drive device 1 parks the cabin 4 in a parking space suitable for inductive charging.

Figure 16:
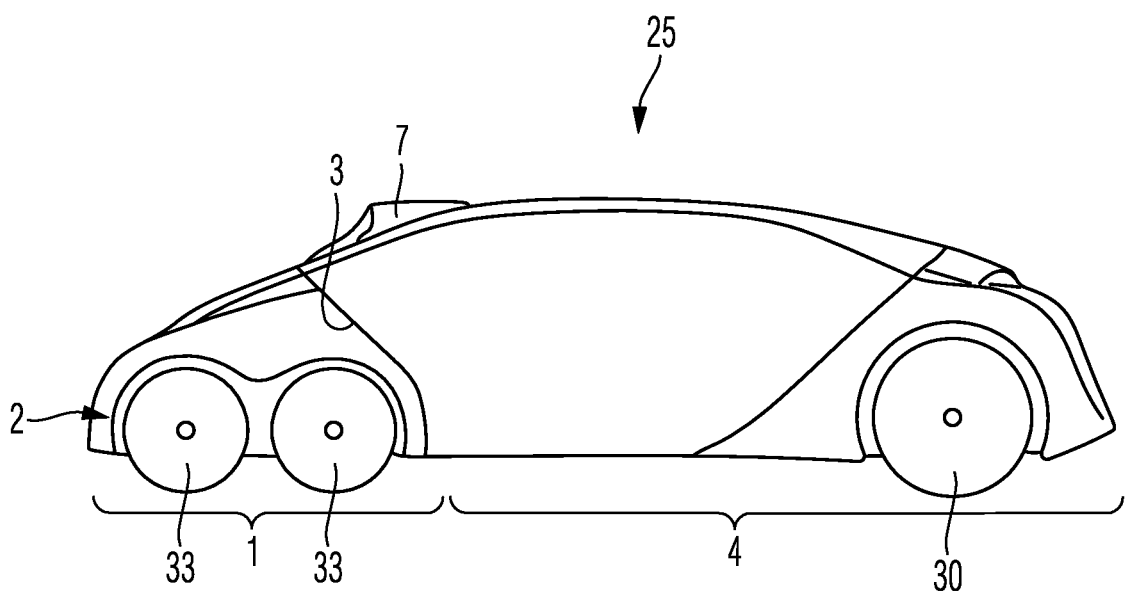
FIG. 16 is a side view of a transport vehicle with a drive device and a coupled cabin according to a further embodiment.

FIG. 16 shows a side view of a transport vehicle 25 with a drive device 1 and a coupled cabin 4 according to a still further embodiment. This embodiment differs from the embodiment according to FIG. 11 by a different design of the wheels 30, 33. The front wheels 33 of the drive device 1 and also the motors of the drive train 2 connected thereto are configured for inner-city operation and the performance of activities in an urban environment. The rear wheels 30 of the cabin 4, on the other hand, are configured to be signifi- cantly larger than the front wheels 33 and are adapted to a comparatively significantly higher output of the auxiliary engine 32 of the cabin 4. In a configuration for long-distance operation, the transport vehicle 25 thus has a significantly higher battery capacity and drive power compared to the drive device 1 on its own. The elongated rear end of the transport vehicle 25 and the overall streamlined shape result in a very favourable air drag coefficient, so that long distances may be covered efficiently and yet at high speed. The overall size and performance of the transport vehicle 25 and the size of the cabin 4 are comparable to those of a mid-size sedan.

The control 31 of the drive device 1 is preferably connected to a sensor unit 6 of the drive device 1 in order to obtain visual, acoustic and other sensor data during operation. Furthermore, the control 31 may also receive sensor data by means of the interface 3, which originate from sensors of the coupled tool or transport modules. In the first operating mode of the drive controller 1, the controller 31 of the drive device 1 autonomously controls its movements based on the sensor data, for example by means of an artificial intelligence module AIM that includes a trained neural network. The neural network NN processes the supplied sensor data in real time and generates control signals for the drive train 2 of the drive device 1. In the second operating mode, the control 31 of the drive device 1 controls not only the movement of the drive device 1 during the performance of the respective work activity, but also the work device 5 autonomously based on the sensor data and sensor signals. In one possible embodiment, the switching between the two operating modes of the drive device 1 is performed by a switching command received from a central controller 35 of a transport means changing system 37, which is received by a transceiver of the drive device 1 by means of a wireless communication link.

FIG. 17 shows an example and schematic of a means-of-transport changing system 37 with a central controller 35 with access to a database 36.

In an alternative embodiment, the switching of the drive device 1 between the two operating modes is also performed autonomously without receiving a switching command from a central controller 35 by evaluating the locally available sensor data, for example by an artificial intelligence module of the controller 31 of the drive device 1. As long as the control 31 of the drive device 1 does not receive an explicit command from the remote central control 35 of the transport means changing system 37 to perform a specific transport task or work activity, it continuously evaluates the received sensor data of the environment and autonomously searches for meaningful activities that it can perform in the local environment with the tools available to it locally. The controller 31 of the drive device 1 can report by means of a wireless interface to the remote central controller 35 of the transportation interchange system 37 what activity it is currently performing. The central control 35 may evaluate a plurality of feedback signals from the drive devices 1 distributed in an area to calculate a transport and/or work requirement currently existing in the area. For this purpose, the central control 35 may also have a neural network. The central control 35 can inform the control 31 of a drive device 1 located in the area by means of a wireless communication link, for example, about which activity the drive device 1 is to perform and, if necessary, indicate suitable tool modules 13 located in the vicinity of the drive device 1 for a work activity and report the instantaneous position and direct the drive device 1 in question to couple a suitable tool module 13 to its parking location. Alternatively, the drive device 1 autonomously moves to a suitable tool module 13 located in the local vicinity of the drive device 1. In a possible embodiment, the requirement for transportation and/or work existing in an area, for example a city district, is calculated by the central controller 35 on the basis of existing data models and/or map data of the area on the basis of sensor data and activity feedback transmitted to it. Depending on the determined local conveyance requirement and/or work requirement, the drive devices 1 present in the area in question are instructed to perform the corresponding activity and are set to the corresponding operating mode. The drive devices 1 then carry out the instructed activities largely autonomously and finally report the successful execution of the activity back to the central controller 35. Communication between the local controller 31 of the drive device 1 and the central controller 35 of the transportation interchange system 37 implemented on a server may be by means of a backbone data network with access points providing a wireless link to a transceiver of the drive device 1. The wireless communication may be provided over a 5G network. Further, a wireless link may also be established involving satellites. The drive devices 1 preferably each have GPS receivers and report their instantaneous positions within the area to the central controller 35. Parked cabins 4 or parked tool modules 13 may also report their instantaneous parking positions to the central controller 35 of the transport device changing system 37 by means of a wireless interface and data network. Sensors of the drive device 1 and/or a tool module 13 as well as sensors scattered in the area can additionally report sensor data, for example temperature data or humidity data to the central controller. From this environmental sensor data of the area concerned, a work requirement in the area may be calculated, for example the necessary watering of a green area or parks located in the area at high temperature and/or low humidity.

Two drive devices 1 may also communicate with each other wirelessly by means of a car-to-car communication link, for example to exchange coupled tool modules 13 or to exchange information regarding work or transport activities.

FIG. 17 shows exemplarily and schematically an example of a transport means changing system 37 according to the present invention. The transport means changing system 37 is provided for a certain area, which is shown schematically in FIG. 17 from above. The area shown is a city district with a plurality of horizontally and vertically extending streets, as schematically shown in FIG. 17. Transport vehicles 25, but also working robots 26 can move on the streets. In the example shown in FIG. 17, transport vehicles 25-1, 25-2, 25-3, 25-4, 25-5 move on the road network of the area, each transport vehicle 25 comprising a drive device 1 and a coupled cabin 4. Oncoming transport vehicles 25-1, 25-3 can, for example, communicate with each other wirelessly by means of a car-to-car communication link. In the example shown in FIG. 17, a working robot vehicle 26-2 moves in the same direction as the transport vehicle 25-2. The working robot vehicle 26 comprises a drive device 1 and a tool module 13 coupled thereto, in particular a road maintenance module 15, as shown in FIG. 6. In the example illustrated in FIG. 17, for example, a drive device 1-1 performs a work activity, for example mowing a lawn, in a particular sub-area of the area. Another drive device 1-2 independently performs an activity, for example a maintenance or monitoring activity, with the aid of its work device 5 in a further area. Different cabins 4-1, 4-2 may be parked in a parking lot, for example, in order to be coupled to a drive device 1. The parked cabins 4-1, 4-2 are, for example, in garages of users in order to offer them a transport possibility if required. Furthermore, couplable tool modules 13-1, 13-2 may also be parked at certain positions within the area so that they may be coupled to drive devices 1 if a need/requirement for this arises. Different types of tool modules 13-1, 13-2, 13-3 may be available in different sub-areas of the area for coupling to drive devices 1. Several transport vehicles 25-4, 25-5 may also communicate with each other to temporarily form a trans-port train, as shown schematically in FIG. 17. For this purpose, the drive devices 1-$i$ of the transport vehicles 25 can communicate with each other by means of a car-to-car communication link. The drive devices 1-$i$ have communication modules or transceivers for communicating with the central controller 35 of the transport means changing system 37, for example by means of access points. The central control 35 of the transport means change system 37 has access to a central or distributed database 36, as shown in FIG. 17. The various drive devices 1-$i$ preferably have GPS receivers and can report their current position within the area to the central controller 35 of the transport means change system 37 by means of access points and/or by means of satellites. The central control 35 has access to map data of the area concerned, stored for example in the database 36. Based on data models and/or the stored map data of the area, as well as on transmitted sensor data and activity feedback from the various drive devices 1, the central control 35 calculates an instantaneous transportation and/or work requirement within the affected area. Based on the determined transportation requirement and/or work requirement, the work devices 1 and/or tool modules 13 present in the respective area are instructed to perform the corresponding activities and dynamically set to the corresponding operating mode. Further, users within the area may report a need for transportation and/or a need for work to the central controller 35 of the transportation interchange system 37 by means of portable user terminals, such as smartphones. For example, if a user U1 reports a need for transportation to the central controller 35 by means of a portable user terminal, the central controller 35 may direct a transportation vehicle 25 or a transportation vehicle train to the reported position of the user, as schematically shown in FIG. 17. Another user U2 can, for example, request a working robot vehicle, for example the working robot vehicle 26-2, by means of his/her portable user terminal, so that it performs, for example, a certain work activity, in particular road maintenance activity, on site. A third user U3 may, for example, by means of his/her portable user terminal or by means of a personal computer connected to the central control unit 35, request a drive device 1-3 located in his/her vicinity to perform a transport activity. The drive device 1-3 may, for example, be coupled to the parked driving vehicle 4-2 of the user 4-3 and transport him/her to a destination position.

Both the drive devices or drive modules 1 and couplable tool modules 13 may have sensors that report sensor data, such as weather data (humidity, temperature, air pressure), to the central controller 35. The sensor data may also be processed locally, for example to detect road damage, in particular using a neural network. The detected road damage can then be reported to the central controller 35, indicating the position.

A plurality of intelligent infra-structure devices may be provided in the area to report a requirement for activity to the central controller 35. For example, a wastebasket or waste container detects the requirement to be emptied and reports this to the central controller 35, which directs a suitable working robot 26 or suitable drive module to empty the wastebasket or waste container to its position. Alternatively, the drive device 1-*i* or the working robot 26 also moves autonomously to the wastebasket or the waste container.

The various drive devices 1-*i* may also independently or autonomously detect a local transportation requirement and/or work requirement and may subsequently perform the requirements autonomously. For example, a drive device 1-*i* to which a passenger cabin 4 is coupled may detect a beckoning user U by means of a characteristic hand movement while driving along a road and stop there to pick up the user U for his/her conveyance into the cabin 4. The user U communicates the desired destination address to the drive device 1, for example, by means of a user interface. The different drive devices 1-*i* preferably continuously perform an activity, i.e. either a conveying activity or a working activity. Only exceptionally, work devices 1-*i* are inactive, in particular if no need or requirement for transportation and/or work is reported to them, and if they cannot detect any meaningful activity in their environment either. The various work devices 1-*i* may communicate wirelessly with each other either directly by means of a local communication link, or indirectly by means of the central controller 35 of the transportation system 37. For example, a drive device 1-*i* may autonomously detect a requirement for a meaningful activity or work activity based on the sensor data available to it, but may not have the appropriate work tools, for example. In this case, the drive device 1-*i* can report the detected work requirement directly or indirectly to another drive device 1, which either has the necessary tools itself or has a suitable coupled tool module 13. During idle times, the drive devices 1, the cabins 4-*i* and the tool modules 13 are preferably charged at charging stations so that they may be activated immediately when required. The transport means change system 37 according to the present invention effects a maximization of the work load of the available work devices 1-*i* as well as of the available cabins 4- and of the tool modules 13. The transport means change system 37 according to the present invention is consequently very efficient and minimizes the emission pollution in the area concerned. A high utilization of the coupled modules also minimizes the number of modules to be provided in the area, so that the traffic density within the road network of the area is also minimized with the aid of the transport means changing system 37 according to the present invention. At the same time, the drive devices 1-*i* as well as their tool modules 13 can perform a variety of different useful work activities in the area, for example, the maintenance of green areas or road repair work.

The system according to the present invention is also particularly suitable for special closed areas, especially for suitably equipped inner-city areas, a university campus, a trade fair or exhibition site, an airport, a wildlife or animal park, a wind park or a nature conservation park.

The system according to the present invention is scalable and may be extended to larger areas. For example, starting from an inner-city core area, the system according to the present invention may be extended to the entire urban area, and from there to a metropolitan area, region, etc.

Although the present invention has been fully described above on the basis of preferred exemplary embodiments, the present invention is not limited thereto, but may be modified in a variety of ways.

LIST OF USED REFERENCE SIGNS

1 Drive device
2 Drive train
3 Interface
3' Counter interface
4 Passenger and/or cargo cabin
5 Work device
6 Sensor unit
7 Head
8 Swivel arm
9 Front
10 Swivel bearing
11 Substructure
12 Gripper arm
13 Tool module
14 Sensors
15 Road cleaning and/or road maintenance module
16 Waste collection module
17 Green waste module
18 Man-machine interface
19 Actuator
20 Gripper arm
21 Container
22 Actuator
23 Cleaning device
24 Joint
25 Transport vehicle
26 Working robot
27 Upper part of the cabin
28 Supports
29 Recess
30 Wheels
31 Control of drive device 1
32 Auxiliary motor
33 Wheels
34 Battery
35 Central control
36 Database
37 Transport means changing system

The invention claimed is:

1. A multimodal drive device for a system for changing means of transportation, the drive device comprising:
   a drive train which is configured for use on the road;
   an interface which is configured for rigid coupling to at least one of a passenger cabin and cargo cabin, and:
   a work device which is configured to perform work activities which are independent of transportation,
   wherein the multimodal drive device has a first operating mode as a transport vehicle in which the drive device is coupled to the at least one passenger cabin or cargo cabin and the drive device is configured to carry out autonomous transportation of passengers or cargo, respectively, and
   wherein the multimodal drive device has a second operating mode as an autonomous mobile working robot in which it is decoupled from the passenger cabin or cargo cabin, respectively, and is configured for autonomous mobile performance of the work activities by the work device or by an attachable tool module, wherein the interface of the drive device is used for rigid and electromechanical coupling to the attachable tool module which supports the drive device in the work activities in the second operating module.

2. The drive device of claim 1,
   wherein the drive device has a sensor unit which forms a highest point of the drive device in the second operating mode.

3. The drive device of claim 2,
wherein a man-machine interface is provided in an area of the sensor unit, the man-machine interface is configured for audio-visual communication with a person in a vicinity of the drive device.

4. The drive device of claim 1,
wherein the work device of the drive device has mechanical working tools or at least a gripper arm, which are configured to perform working activities.

5. The drive device of claim 1,
wherein the interface of the drive device is configured for coupling to an attachable tool module which may be coupled mechanically and electrically to the drive device in the second operating mode.

6. The drive device of claim 1,
wherein the work device of the drive device or the tool module is configured for road cleaning or for road maintenance, wherein the tool module forms a road cleaning module or road maintenance module which may be coupled to the interface of the drive device and may be controlled by a controller of the drive device.

7. The drive device of claim 1,
wherein the work device of the drive device or the tool module is configured for collecting waste or for emptying public waste containers, wherein the tool module forms a waste collection module which may be coupled to the interface of the drive device and may be controlled by a controller of the drive device.

8. The drive device of claim 1,
wherein the work device of the drive device or the tool module is configured for greenkeeping, wherein the tool module forms a greenkeeping module which may be coupled to the interface of the drive device and may be controlled by a controller of the drive device.

9. The drive device of claim 1,
wherein the work device of the drive device or the tool module is configured for safety monitoring, wherein a sensor unit of the drive device or the tool module has sensors configured for safety monitoring of an environment of the drive device.

10. The drive device of claim 1,
wherein the drive device comprises a controller which autonomously controls a movement of the drive device by controlling at least one of the drive train of the device, a drive train of a coupled passenger cabin, a drive train of a cargo cabin or the coupled tool module on a basis of sensor data of an environment of the drive device.

11. The drive device of claim 10,
wherein the controller of the drive device is configured to autonomously control the work device of the drive device or the coupled tool module into the second operating mode on the basis of sensor data of the environment of the drive device.

12. The drive device of claim 10,
wherein the controller of the drive device comprises an artificial intelligence module, which is configured to evaluate received sensor data of the environment of the drive device for controlling the drive train of at least one of the drive device, the work device or the coupled tool module.

13. The drive device of claim 1,
wherein the performed work activities are at least one of:
maintenance activities,
clearing activities,
servicing activities,
monitoring activities.

14. The drive device of claim 1,
wherein the work device of the drive device has attached tool modules which are configured to perform working activities.

15. A transport means changing system comprising a plurality of multimodal drive devices for changing means of transportation, which may be configured for autonomous passenger or cargo transport or for autonomous work, wherein a central control of the transport means changing system configures the drive devices distributed in an area in dependence on a transport requirement existing in the area or an existing work requirement;
wherein the multimodal drive device comprising:
a drive train which is configured for use on the road;
an interface which is configured for rigid coupling to at least one of a passenger cabin and cargo cabin, and:
a work device which is configured to perform work activities which are independent of transportation,
wherein the multimodal drive device has a first operating mode as a transport vehicle in which the drive device is coupled to the at least one passenger cabin or cargo cabin and the drive device is configured to carry out autonomous transportation of passengers or cargo, respectively, and
wherein the multimodal drive device has a second operating mode as an autonomous mobile working robot in which it is decoupled from a passenger cabin or cargo cabin, respectively, and is configured for autonomous mobile performance of the work activities by the work device or by an attachable tool module, wherein the interface of the drive device is used for rigid and electromechanical coupling to the attachable tool module which supports the drive device in the work activities in the second operating mode.

16. The transport means changing system of claim 15, wherein at least one of the transport requirement or existing work requirement existing in the area is determined by sensors.

17. The transport means changing system of claim 15, wherein at least one of the transport requirement or existing work requirement existing in the area is calculated on a basis of data models comprising stored map data of the area, as well as transmitted sensor data, activity feedback from the a plurality of drive devices.

* * * * *